United States Patent [19]

Carduner

[11] 4,271,716
[45] Jun. 9, 1981

[54] LOADING MECHANISM FOR RACK AND PINION STEERING

[75] Inventor: Jean-Jacques Carduner, Sannois, France

[73] Assignee: Regie Nationale des Usines Renault, Boulogne-Billancourt, France

[21] Appl. No.: 43,756

[22] Filed: May 30, 1979

[30] Foreign Application Priority Data

May 30, 1978 [FR] France .............................. 78 16019

[51] Int. Cl.³ ........................ F16H 19/04; B62D 3/12
[52] U.S. Cl. ....................................... 74/422; 308/6 C
[58] Field of Search ...................... 74/422, 424.6, 406, 74/411, 89.17, 29, 492; 308/6 C

[56] References Cited

U.S. PATENT DOCUMENTS

| | | | |
|---|---|---|---|
| 3,436,132 | 4/1969 | Wiesler | 308/6 C |
| 3,747,429 | 7/1973 | Cass | 74/422 X |
| 3,897,982 | 8/1975 | Teramachi et al. | 308/6 C |

FOREIGN PATENT DOCUMENTS

| | | | |
|---|---|---|---|
| 1314946 | 12/1962 | France | 308/6 C |
| 1487363 | 5/1967 | France . | |
| 2139460 | 1/1973 | France . | |
| 949061 | 2/1964 | United Kingdom | 74/422 |
| 1337523 | 11/1973 | United Kingdom | 74/422 |
| 2013304 | 8/1979 | United Kingdom . | |

Primary Examiner—C. J. Husar
Assistant Examiner—Conrad Berman
Attorney, Agent, or Firm—Oblon, Fisher, Spivak, McClelland & Maier

[57] ABSTRACT

A loading mechanism in which the portion of the loading mechanism facing the rack carries a cradle consisting of a support upon which are fashioned two oval-shaped bearing races and a retainer for securing alternately loaded and non-loaded ball-bearings. The retainer includes slots allowing the loaded ball-bearings to contact the rack.

6 Claims, 9 Drawing Figures

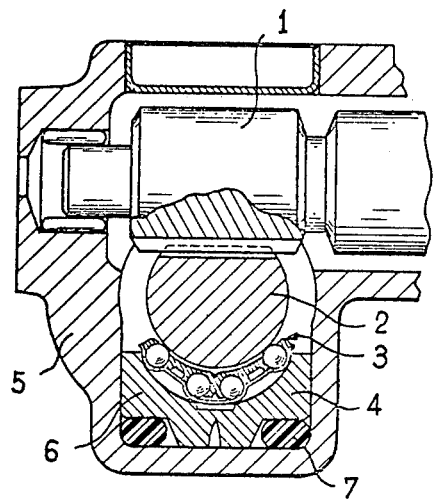
FIG_1
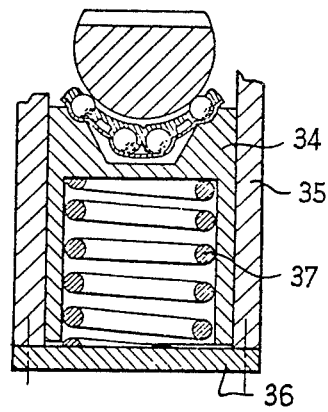
FIG_3
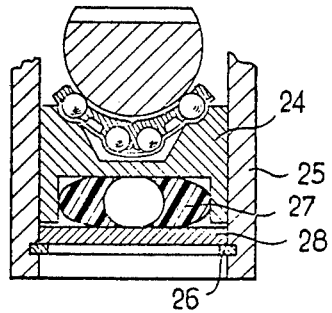
FIG_2
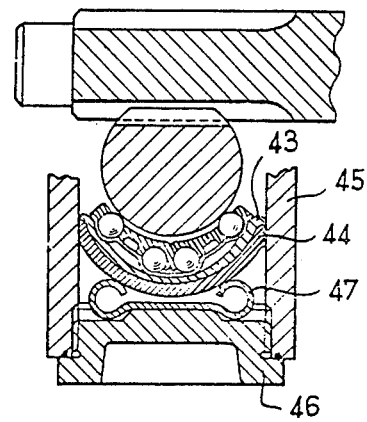
FIG_4
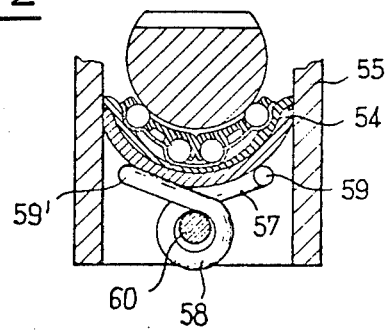
FIG_5

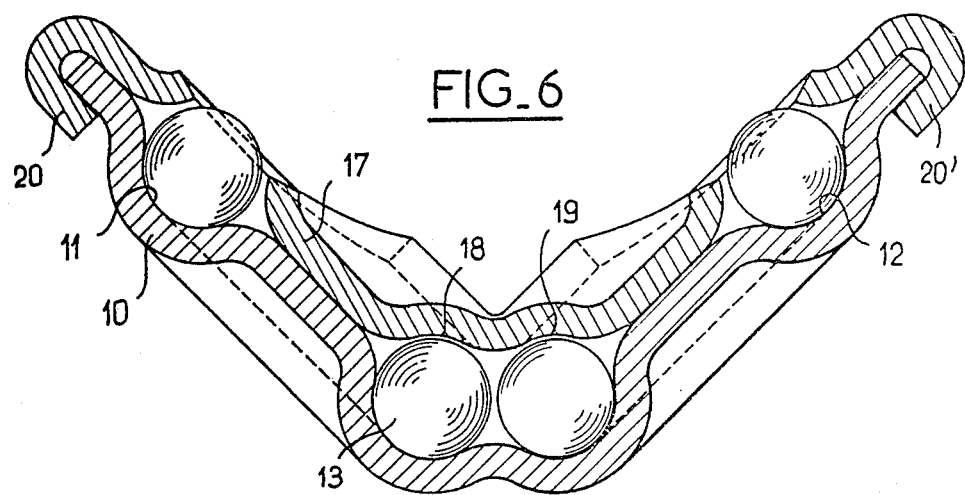
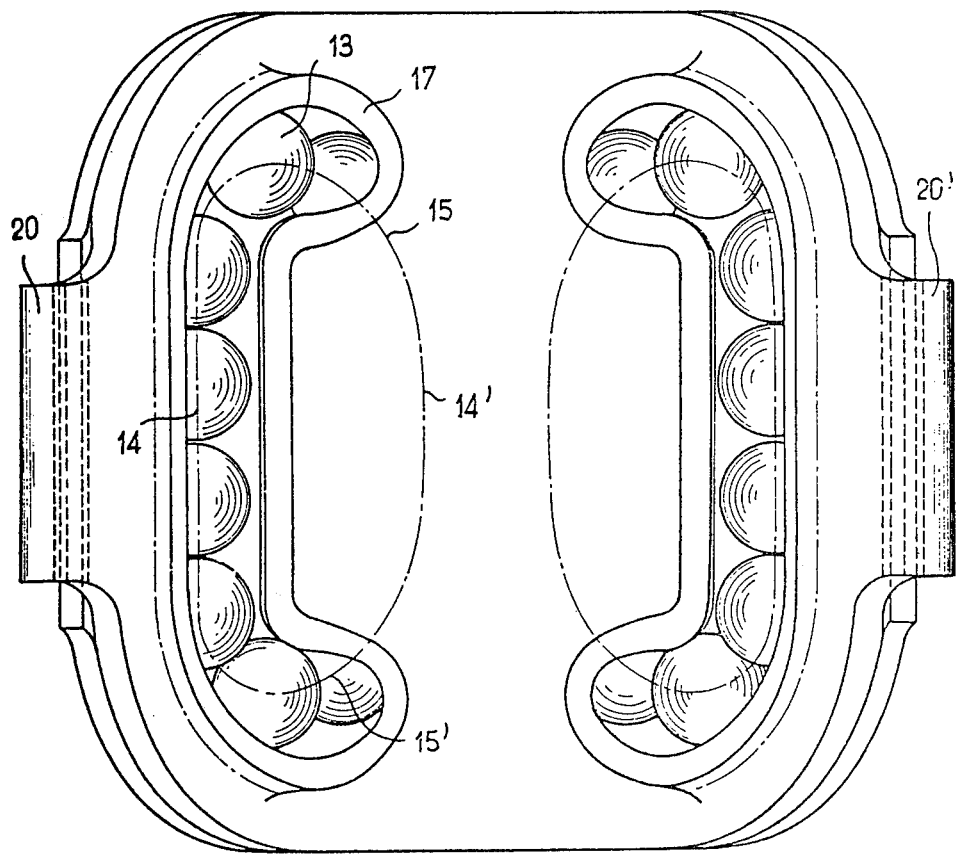

LOADING MECHANISM FOR RACK AND PINION STEERING

BACKGROUND OF THE INVENTION

1. Field of the Invention

This invention relates to a rack and pinion steering loading mechanism designed to take up the play between the rack and the drive pinion and to be free of operating rattles.

2. Description of the Prior Art

It is known that the loading mechanism, along which the rack slides, must ensure permanent contact between the rack and pinion to compensate for wear in these two elements, for deformation during operation of the rack, and for factory irregularities in the rack and pinion.

Known loading mechanisms were generally comprised of discrete metal or plastic parts which were often noisy and which gave off characteristic rattles during operation. To eliminate this, contact pressure between the loading mechanism and the rack was increased, but at the expense of the ease of movement of the rack along the loading mechanism.

SUMMARY OF THE INVENTION

The object of the invention is a rack and pinion steering loading mechanism which eliminates the aforementioned drawbacks of known loading mechanisms and which is characterized by the fact that the part of the loading mechanism facing the rack carries a ball-bearing retainer, said ball-bearings being placed in a rolling path, said retainer consisting of a cradle having two longitudinal races of oval shape and two areas of contact with the rack, said ball-bearings substantially filling the races and being alternately loaded and not loaded so as to enable them to roll during the shifting motions of the rack.

Such a loading mechanism enables the application of pressure to one part of the rack, in the form of two forces of equal intensity, directed essentially perpendicularly to the axis of the rack, thereby tending to push the rack from said cradle and move it towards the pinion.

In the preferred embodiment of the invention, the cradle, having oval-profiled slides, forms one of the sheet-metal races of a two-track ball-bearing consisting of two straight portions, in contact with the loaded and non-loaded balls respectively, and two curved portions linking the ends of the straight portions.

According to another characteristic of the invention, the cradle with oval-shaped slides rests on the concave surface of the loading mechanism, while an elastic element mounted between the loading mechanism and a stop assures the required pressure of the loading mechanism against the rack.

The resulting loading mechanism eliminates friction between it and the rack and enables a considerable increase in the pressure of contact with the latter. As a result, rattles consequent upon the recoil of the loading mechanism, due to interferences such as shocks between the wheels, braking stress, vibrations, etc., or to a fault in the rack and pinion mechanism, are suppressed.

The invention also has the advantage of being applicable to a loading mechanism not having a system for adjustment of the pressure of the loading mechanism upon the rack, since the ball-slide cradle can tolerate relatively high pressures without prejudicing the proper sliding of the rack.

The invention also offers the advantage of a simplified embodiment according to which the loading mechanism is mounted directly in the steering box and is held there by means of a stopping device which may be connected or combined with an elastic element.

BRIEF DESCRIPTION OF THE DRAWINGS

Various other objects, features and attendant advantages of the present invention will be more fully appreciated as the same becomes better understood by the following detailed description when considered in connection with the accompanying drawings wherein like reference characters designate like or corresponding parts throughout the several view, and wherein:

FIGS. 1 through 5 are cutaway views, on a plane perpendicular to the axis of the rack, of embodiments of the loading mechanism according to the invention;

FIG. 6 is a larger scale cutaway view of the pressure cradle and its ball-bearing retainer;

FIG. 7 is a top view of the pressure cradle and its ball-bearing retainer, as represented in FIG. 6;

DETAILED DESCRIPTION OF THE PREFERRED EMBODIMENTS

Figure 8:
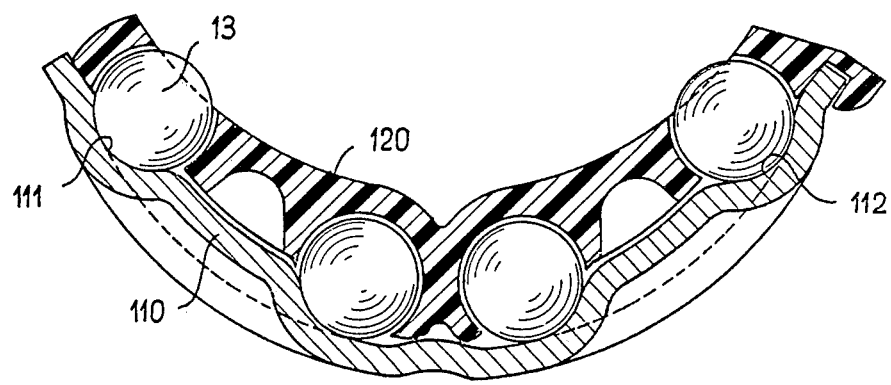
FIG. 8 is a cutaway view of another embodiment of the pressure cradle.
Figure 9:
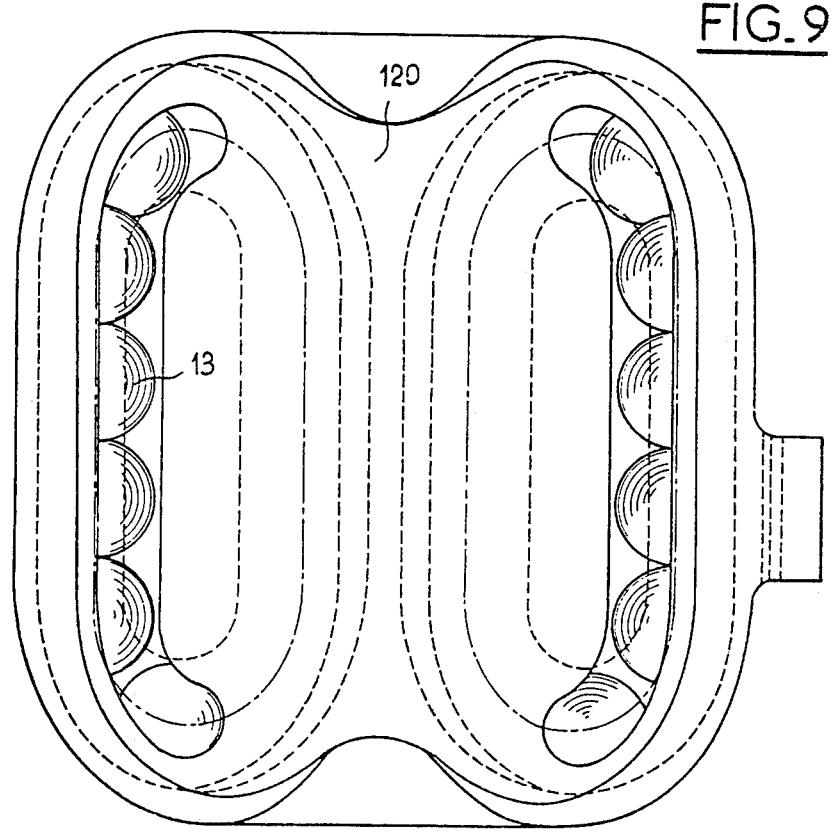
FIG. 9 is a top view of the pressure cradle represented in FIG. 8.

In the embodiment illustrated in FIG. 1, in a rack and pinion steering mechanism, a control pinion 1 engages the teeth of a rack 2, which slides in a concave cradle 3 set into a loading mechanism 4 mounted in a rack housing 5. Loading mechanism 4 is generally of cylindrical form, terminating at the rack end in a concave seating 6, the surface of which rests against cradle 3.

Loading mechanism 4 may be formed from a construction material such as steel, aluminum or zamac or a plastic material such as nylon, or from an acetate, polyamide or other resin.

The loading mechanism is mounted in housing 5 and is held there by means of a part of the housing forming the seating surface of the loading mechanism. Between this retaining means and loading mechanism 4 is advantageously placed a resilient elastic element 7, consisting, for example, of a bushing of flexible polymer.

In the embodiment represented in FIG. 2, loading mechanism 24 is mounted in housing 25 and held there by means of a stop ring or circular clip 26 and separated from it by a washer 28 and the flexible polymer bushing 27.

In the embodiment represented in FIG. 3, loading mechanism 34 is mounted in housing 35 and held there by means of a cap 36 and separated by a coil spring 37.

In the embodiment represented in FIG. 4, loading mechanism 44 is mounted in housing 45 and held there by means of a plug 46 and separated from the loading mechanism by a flat-spring 47.

In the embodiment represented in FIG. 5, loading mechanism 54 is mounted in housing 55 and held there by means of torsion spring 57 consisting of a coil 58 of elastic wire rolled around an axis 60 which is fixed to housing 55. Extremities 59, 59' press upon the loading mechanism.

It should be noted that loading mechanism 44 is extremely simplified in its construction, represented by a concave disk cut into a portion of a cylinder onto which is molded an airtight peripheral lip 43 which contacts the housing of the loading mechanism.

According to the invention, cradle 3 of the loading mechanism contains two oval-shaped races. It is to be noted that the profile of these races, as well as their mode of operation, is itself known and does not form part of the invention.

The object of the present invention is the particular adaptation of these races to a rack and pinion steering loading mechanism. To this effect, according to the embodiment represented in FIG. 6, races 11, 12 are fashioned upon a support plate of hardened steel 10 and receive ball-bearings 13.

Races 11, 12 consist of two straight portions 14 and 14' and two curved portions 15, 15' which link the extremities of these straight portions.

Each of the races, which are substantially filled with ball-bearings, thus consists of a straight portion 14 in which balls 13 are in direct contact with rack 2, and consequently support the load, and a straight portion 14' in which balls 13 are not in contact with rack 2 and thus do not support any load. Curved portions 15 and 15' enable balls 13 to pass freely from one straight portion of the track to another, following the direction in which the loaded balls are drawn by the movement of rack 2.

In each of these embodiments, metal support plate 10 is connected to a retainer 17 in which are likewise fashioned slides consisting of two circulation races 18, 19 capping races 11, 12 of support 10.

Retainer 17, constituting the element for retaining of balls 13, is fabricated from sheet metal using a press and a tool of appropriate form in order to create a plate with protrusions, depressions and grooves as shown in FIGS. 6 and 7. This plate is then bent to give it the shape of a "V", the legs of which contain slots which expose the entire set of loaded balls. The extremities of the plate cap the extremities of support plate 10 and form retaining tabs 20, 20'. Thanks to the arrangement of retainer 17, it not only serves to form the slides but acts as an element which continuously retains the balls between support 10 and retainer 17. When the latter have been firmly joined by means of the retaining tabs 20, 20', a pre-assembled, one-piece unit has been created.

In the embodiment shown in FIG. 8, the element for retaining the balls 13 consists of a plastic retainer 120 having ratchet cells fitted over balls 13 and support 110. This embodiment simplifies the manufacture of support 110 by simplifying the straight portions of the ball races 111.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vehicle steering mechanism including a housing, a drive pinion extending into said housing, a rack moveable within said housing and engageable with said drive pinion and a loading mechanism moveably supporting said rack within said housing, said loading mechanism comprising:
   a fixed ball-bearing support having two oval-shaped longitudinal tracks;
   a plurality of ball-bearings disposed in and substantially filling said tracks, said ball-bearings contacting said rack at two areas of contact on said tracks; and
   a ball-bearing retainer located between said ball-bearing support and said rack, said support and said retainer forming a cradle, said ball bearing retainer including retainer tabs secured to said ball bearing support to form a pre-assembled unit;
   wherein said ball-bearings are alternately loaded and unloaded as they move through said areas of contact.

2. The loading mechanism of claim 1, wherein said rack is disposed in a housing and said loading mechanism further comprises a concave disk disposed within said housing, said concave disk including a peripheral lip which contacts said rack housing in an airtight manner, and said cradle resting upon said disk.

3. The loading mechanism of claims 1 or 2 wherein each of said tracks consists of two straight portions and two curved portions which connect the extremities of said straight portions.

4. The loading mechanism of claim 3 wherein said ball-bearing retainer is in the shape of a "V", the legs of which comprise slots exposing the balls which are in said areas of contact.

5. The loading mechanism of claim 1 wherein said ball-bearing retainer has ratchet cells fitted over said ball-bearings.

6. The loading mechanism of claim 1 wherein said loading mechanism is retained in said housing of said steering mechanism by means of a torsion spring consisting of an elastic coil rolled around an axis affixed to said housing, the extremities of said spring pressing upon said loading mechanism.

* * * * *